United States Patent [19]
Urino et al.

[11] Patent Number: 5,835,270
[45] Date of Patent: Nov. 10, 1998

[54] OPTICAL ISOLATOR DEVICE

[75] Inventors: Yutaka Urino; Tomoki Saito, both of Tokyo, Japan

[73] Assignee: NEC Corporation, Tokyo, Japan

[21] Appl. No.: 7,511

[22] Filed: Jan. 22, 1993

[30]     Foreign Application Priority Data

Jan. 22, 1992  [JP]  Japan .................................. 4-031586

[51] Int. Cl.⁶ .................................................. G02B 5/30
[52] U.S. Cl. ........................ 359/484; 359/281; 359/282; 359/283
[58] Field of Search .................. 359/281, 282, 359/283, 484; 372/703

[56]              References Cited

U.S. PATENT DOCUMENTS

| | | | |
|---|---|---|---|
| 3,267,804 | 8/1966 | Dillon, Jr. | 359/484 |
| 4,464,022 | 8/1984 | Emkey | 359/484 |
| 4,712,880 | 12/1987 | Shirasaki | 359/484 |
| 4,974,944 | 12/1990 | Chang | 359/484 |
| 5,204,771 | 4/1993 | Koga | 359/484 |

FOREIGN PATENT DOCUMENTS

| | | | |
|---|---|---|---|
| 0352002 | 1/1990 | European Pat. Off. . | |
| 0489315 | 6/1992 | European Pat. Off. . | |
| 53-108451 | 9/1978 | Japan | 359/484 |
| 58-116515 | 7/1983 | Japan | 359/484 |
| 60-130934 | 7/1985 | Japan | 359/484 |
| 60-49297 | 11/1985 | Japan . | |
| 61-58809 | 12/1986 | Japan . | |
| 1-105908 | 4/1989 | Japan | 359/484 |
| 2-287528 | 11/1990 | Japan . | |
| 3-139672 | 6/1991 | Japan . | |
| 4-51214 | 2/1992 | Japan . | |
| 4-73712 | 3/1992 | Japan | 359/484 |
| 4-221923 | 8/1992 | Japan | 359/487 |

OTHER PUBLICATIONS

The Institute of Electronics, Information and Communication Engineers, Tokyo Japan 1991 Spring National Convention Record (Mar. 26–29, 1991) 4–125; Fujita et al.:"A polarization–independent optical isolator with fiber pigtails".

Patent Abstracts of Japan, vol. 9, No. 291 (E–359) Nov. 19, 1985.

European Search Report EP 93 10 0926.

*Primary Examiner*—Georgia Y. Epps
*Attorney, Agent, or Firm*—Ostrolenk, Faber, Gerb & Soffen, LLP

[57]             ABSTRACT

An optical isolator device is provided which is free from polarization dispersion. The optical isolator device presents an optical path which is equidistant for both an ordinary ray and an extraordinary ray. The optical isolator device of the present invention comprises a first and second optical isolator, each of identical thickness and each comprising a birefringent for separating an ordinary ray and an extraordinary ray, a polarization rotator for rotating the plane of polarization of these rays and a birefringent for continuing the ordinary ray and the extraordinary ray. In an embodiment of the present invention, an optical isolator device comprises two optical isolators in series, each comprising a first birefringent element for separating an input beam into an ordinary ray and an extraordinary ray, a polarization rotator for rotating the planes of polarization of the ordinary and extraordinary rays by $(2m \pm \frac{1}{2}) \times 90$ degrees (m being an integer), and a second birefringent element for combining the extraordinary ray with the ordinary ray.

2 Claims, 4 Drawing Sheets

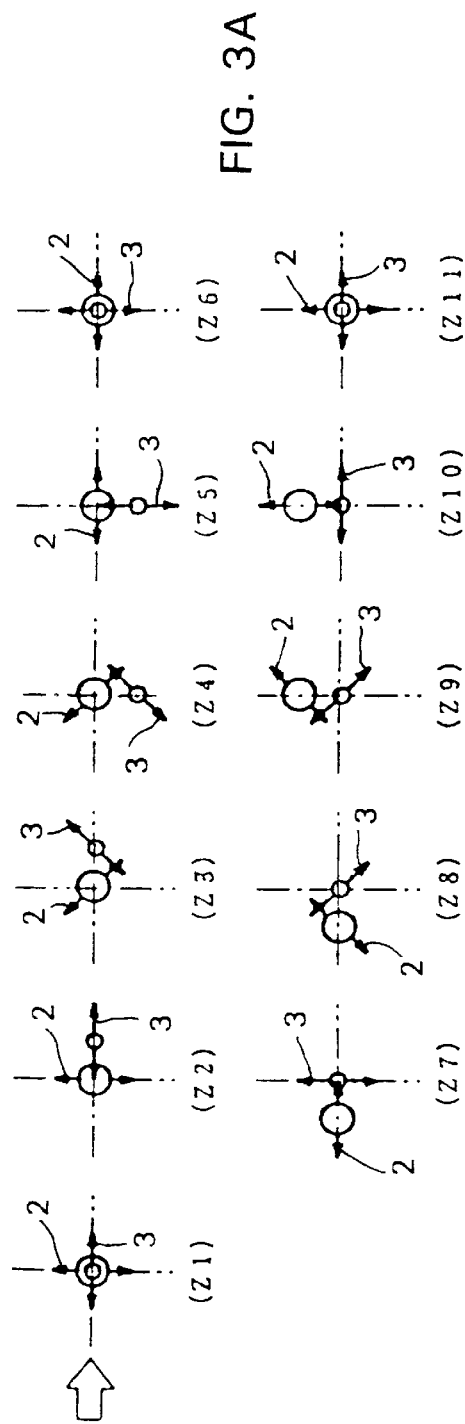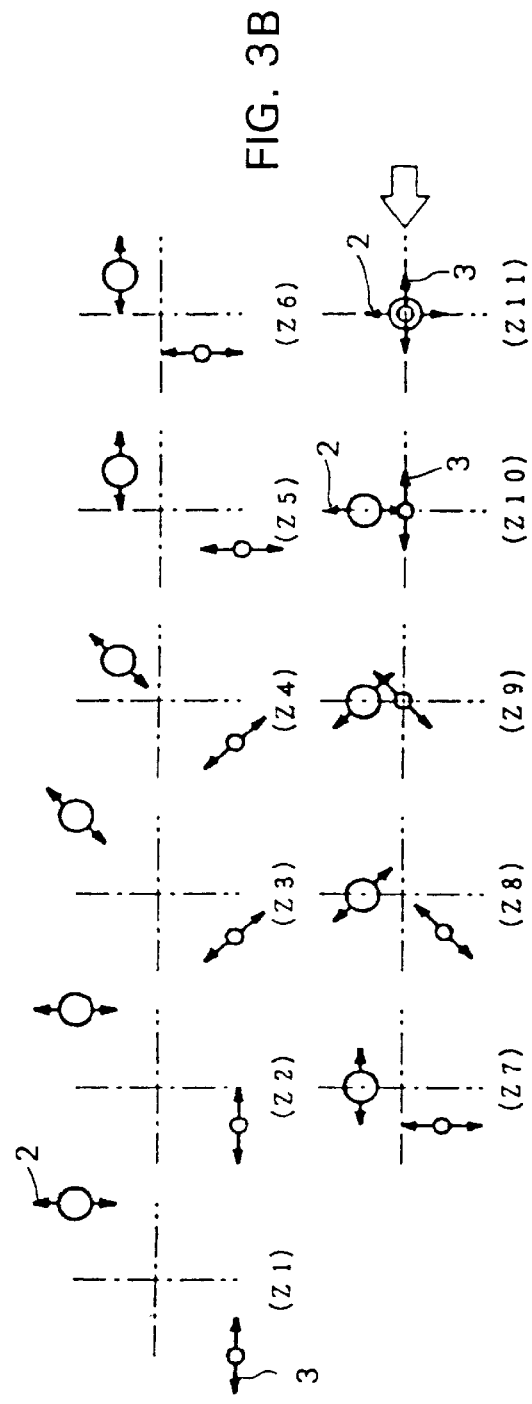

OPTICAL ISOLATOR DEVICE

BACKGROUND OF THE INVENTION

The present invention relates to an optical isolator device and, more particularly, to a polarization insensitive optical isolator device having characteristics that do not depend on the polarization state of an incident light beam.

In an optical communication network, communication quality is affected by reflections from, for example, the ends of various optical parts. Removing these reflections is important to the communication quality. Generally, a light beam propagated through an ordinary optical fiber has an arbitrary polarization. Moreover, the polarization state changes due to the factors including varying ambient temperature and deformation of the fiber. Therefore, it is desirable, in an optical isolator device for an optical fiber communication network, that the isolator be polarization insensitive for both a forward light beam and a reverse light beam. For polarization insensitive optical isolator devices, reference may be made to, for example, Japanese Patent Publication Nos. 49297/1985 and 58809/1986 issued Nov. 1, 1985 and Dec. 13, 1986, respectively.

An optical isolator device taught in the above Patent Publication No. 49297/1985 has a first birefringent crystal plate for separating an incident light beam into an ordinary ray and an extraordinary ray, a Faraday rotator for rotating the polarization direction of the two rays from the first crystal plate by 45 degrees, and a second birefringent crystal plate for combining the two polarization components that have passed the Faraday rotator. When a reflection of the output beam of the isolator device is propagated through the device in the opposite direction, the relation between the polarizations is reversed in the first crystal plate. As a result, the forward and reverse beams do not follow the same optical path, thus isolation is achieved. This kind of isolator device is free from changes in loss caused by the changes in the polarization of the input beam since light in the isolator device moves in a constant manner without regard to the polarization orientation of the input beam.

The isolator device of Patent Publication No. 58809/1986 is, in principle, the same as the above-stated isolator device except that the birefringent crystal plates are wedge-shaped.

To enhance the isolation, a first birefringent crystal plate, a Faraday rotator, a second birefringent crystal plate, a Faraday rotator and a third birefringent crystal plate may be sequentially arranged in this order, as disclosed in Summaries of 1991 Spring Conference of The Institute of Electronics, Information and Communication Engineers, pp. 4–125.

In any of the three types of conventional optical isolator devices described above, the birefringent crystal plates allow the ordinary ray of the incident beam to advance straight while refracting the extraordinary ray. Since the path of the ordinary and extraordinary rays are not exchanged within the isolator device, the latter is propagated over a longer optical path than the former due to the refraction.

An optical fiber communication system covering a longer distance than these conventional ones without repeating has recently been reported. In this type of system, a difference in propagation time between polarizations perpendicular to each other causes polarization dispersion, which still limits the distance and frequency band available for transmission. The propagation time difference between the ordinary and extraordinary rays is determined by the thicknesses and number of the birefringent crystal plates. This difference in propagation time causes polarization dispersion which limits the transmission distance and frequency band.

SUMMARY OF THE INVENTION

It is, therefore, an object of the present invention to provide an optical isolator device free from the aforementioned polarization dispersion.

In accordance with the present invention, a first embodiment of an optical isolator device comprises a first and a second optical isolator having an identical thickness. Each optical isolator comprises a birefringent element for separating an input beam into an ordinary ray and an extraordinary ray, a polarization rotator for rotating a plane of polarization of the ordinary and extraordinary rays by $(2m\pm\frac{1}{2})\times 90$ degrees (m being an integer), and a birefringent element for combining the extraordinary ray, with the ordinary ray after having passed the polarization rotator, to output the combined rays. The first and second optical isolators are arranged in series. The birefringent element located at the input side of the second optical isolator has an optic axis rotated by 90 degrees (in the direction of rotation of the polarization rotators) relative to an optic axis of the birefringent element located at the output side of the first optical isolator. As a result, the birefringent element at the input side of the second optical isolator reverses the polarization state, thereby providing the ordinary ray and the extraordinary ray (separated by the birefringent element located at the input side of the first isolator element) with optical paths of equal length.

Also in accordance with the present invention, a second embodiment of an optical isolator device comprises a first birefringent element for separating an input beam into an ordinary ray and an extraordinary ray, a polarization rotator for rotating a plane of polarization of the ordinary and extraordinary rays by $(2m\pm\frac{1}{2})\times 90$ degrees (m being an integer), a second birefringent element for combining the extraordinary ray, with the ordinary ray after having passed the polarization rotator, and a plurality of birefringent elements, each adjoining one of the first and second birefringent elements and having the same thickness as the birefringent element it adjoins, wherein the first and second birefringent elements and the plurality of birefringent elements have an opposite polarization relation between an ordinary ray and an extraordinary ray.

Further, in accordance with the present invention, a third embodiment of an optical isolator device comprises a birefringent element for separating an input beam into an ordinary ray and an extraordinary ray, a polarization rotator for rotating a plane of polarization of the ordinary and extraordinary rays by $(2m\pm\frac{1}{2})\times 90$ degrees (m being an integer), and a birefringent element for combining the extraordinary ray, with the ordinary ray, after having passed the polarization rotator, and a phase element located on an optical axis of a beam incident on the optical isolator device. The phase element having a thickness equal to the total thickness of all of the birefringent elements, whereby a difference between the ordinary and extraordinary rays in a length of an optical path is reduced to zero.

BRIEF DESCRIPTION OF THE DRAWINGS

The above and other objects, features and advantages of the present invention will become more apparent from the following detailed description taken with the accompanying drawings in which:

FIGS. 3A and 3B show the polarization components of forward and reverse light beams respectively as observed at consecutive positions in the embodiment of FIG. 1;

DETAILED DESCRIPTION OF THE PREFERRED EMBODIMENTS

Figure 1:
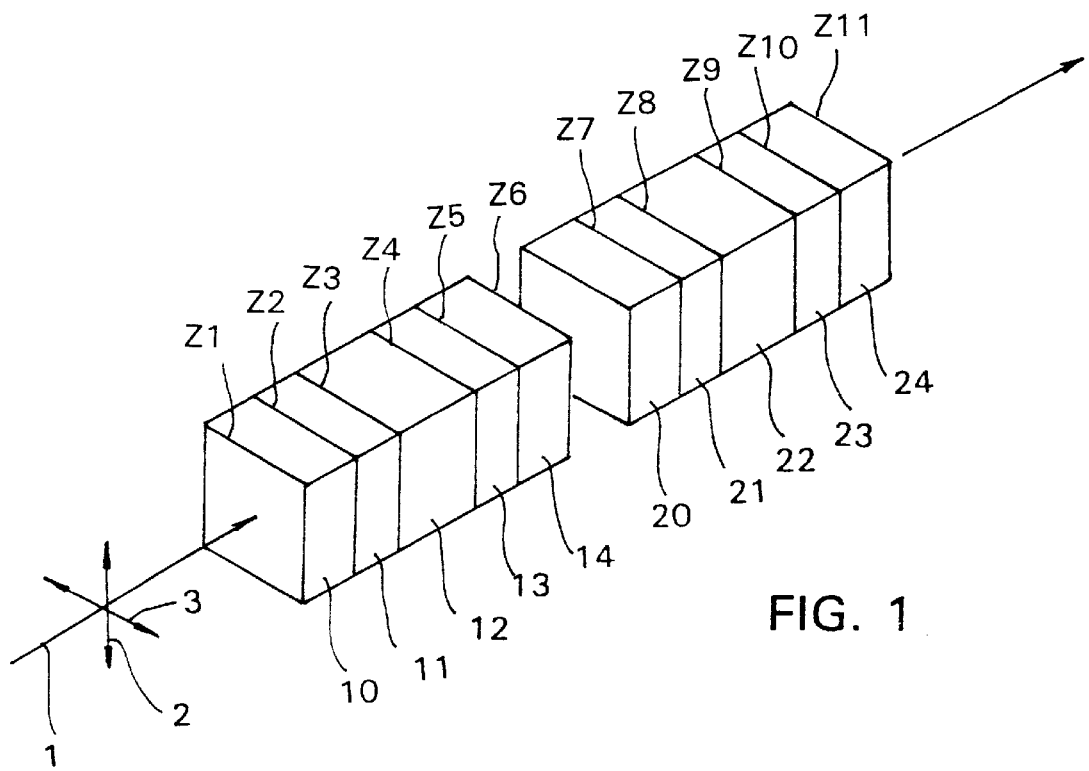
FIG. 1 is a perspective view showing an optical isolator device embodying the present invention.

Referring to FIG. 1 of the drawings, a first embodiment of an optical isolator device according to the present invention is shown. The isolator is made up of two optical isolators 100 and 200 arranged in series on the optical axis of an incident light beam 1. The isolator 100 has first, second and third birefringent crystal plates 10, 12 and 14, and first and second Faraday rotators 11 and 13. First Faraday rotator 11 is interposed between the first and second birefringent crystal plates 10 and 12 and affixed thereto by an adhesive. Similarly, the second Faraday rotator 13 is interposed between the second and third birefringent crystal plates 12 and 14, and affixed thereto by an adhesive. The thicknesses of the crystal plates 10, 12 and 14 as measured in the direction of the optical axis of the beam 1 are in a ratio of $1:\sqrt{2}:1$ respectively.

Likewise, the isolator 200 has fourth, fifth and sixth birefringent crystal plates 20, 22 and 24, and third and fourth Faraday rotators 21 and 23. The crystal plates 20–24 and Faraday rotators 21 and 23 are arranged in a similar order and provided with the same thicknesses as in the isolator 100.

The Faraday rotators 11, 13, 21 and 23 each rotates the polarization plane by 45 degrees counterclockwise as seen from the incidence plane in the forward direction (direction of incidence). The rotation is effected by a magnetic field applied from a permanent magnet to each Faraday rotator. The optic axes of the birefringent crystal plates are related as follows. The optic axis of the crystal plate 14 is rotated by 90 degrees counter clockwise around the axis of the beam 1 relative to that of the crystal plate 10, (e.g., in the same direction of rotation of the Faraday rotators). The optic axis of the crystal plate 20 is rotated by 90 degrees, counter clockwise relative to that of the crystal plate 14. Crystal plate 12 is rotated by 135 degrees counter clockwise relative to that of the crystal plate 10. Polarization 3 moves in the direction corresponding to the refraction. In addition, since the crystal plate 12 is $\sqrt{2}$ times as thick as the crystal plate 10, the distance of movement due to refraction is also $\sqrt{2}$ times longer. Consequently, at the position Z4, the extraordinary ray moves to just beneath the ordinary ray.

In other words, if the optic axis of the first birefringent crystal 10 were at 0 degrees, then the second birefringent crystal 12 would be at 135 degrees, the third birefringent crystal 14 would be at 270 degrees, the fourth birefringent crystal 20 would be at 180 degrees, the fifth birefringent crystal 22 would be at 315 degrees, and the sixth birefringent crystal would be at 90 degrees.

The plane of polarization of the beam from the crystal plate 12 is rotated by 45 degrees counterclockwise by the Faraday rotator 13 (position Z5). The third crystal plate 14 refracts the extraordinary ray (polarization 3) such that it coincides with the ordinary ray (polarization 2). The superposed light is then on the optical axis of the beam 1 (position Z6). Thus, only the polarization 3 turns out an extraordinary ray in the isolator 100.

The beam at the position Z6 is incident on the fourth crystal plate 20. However, since the optic axis of the crystal plate 20 is rotated by 90 degrees relative to that of the crystal plate 14 in the direction of rotation of the Faraday rotator, the ordinary and extraordinary rays are reversed, in other words the polarizations 2 and 3 become an extraordinary ray and an ordinary ray, respectively. Since the isolators 100 and 200 are substantially identical in properties and in the thicknesses of their constituent birefringent crystals, the extraordinary ray (polarization 2) between the positions Z6 and Z11 follows a path of substantially the same length as the path followed by polarization 3 between positions Z1 and Z6. The optic axis of the crystal plate 24 is rotated by 90 degrees counter clockwise relative to that of the crystal plate 20. The optic axes of the crystal plates 20, 22 and 24 are respectively rotated by 180 degrees relative to those of the crystal plates 10, 12 and 14. Further, the axes of the crystal plates 12 and 22 are each rotated by 135 degrees relative to those of the adjoining crystal plates.

FIG. 3A shows polarization components observed at consecutive positions Z1–Z11 between the adjoining optical elements and through which the beam 1 passed, as seen in the direction of incidence. In the figure, big circles and small circles distinguish the movements of perpendicular polarization components, or simply stated as polarizations 2 and 3 of the beam 1.

The beam 1 is separated into an ordinary ray (polarization 2) and an extraordinary ray by the first crystal plate 10 (position Z2). The Faraday rotator 11 rotates the polarizations, 2 and 3, from the crystal plate 10 by 45 degrees counterclockwise. As a result, the polarization 3 incident on the second crystal plate 12 (position Z3) is an extraordinary ray due to the orientation of the optic axis of the crystal plate 12. Extraordinary ray (polarization 3) is further refracted by the crystal plate 12 in a direction which is dependent on the orientation of the optic axis of crystal plate 12. Subsequently, Faraday rotator 13 rotates the two polarizations 2 and 3, from the crystal plate 12 by 45 degrees counter clockwise. As a result, the polarization 3, incident in the third crystal plate 14 (position Z5) is again an extraordinary ray. And again, extraordinary ray (polarization 3) is further refracted by crystal plate 14 to a position coinciding with the ordinary ray (polarization 2).

It should be understood that the length of the path of the extraordinary ray (polarization 3) between positions Z1 and Z6 differs from the length of the path of the ordinary ray (polarization 2) between the same positions. Importantly, the optical path length of the extraordinary ray (polarization 3) between the positions Z1 and Z6 is substantially equal to the optical path length of the extraordinary ray (polarization 2) between positions Z6 and Z11. As a result, both compounds (ordinary and extraordinary) of the beam both compound pass through the two isolators 100 and 200 in the forward direction and are propagated through an optical path of the same length without regard for the polarization of the beam 1.

On the other hand, as the beam from the isolator 200 is reflected by, for example, the end face of an optical fiber, beams oriented in opposite directions move as shown in FIG. 3B which is a view similar to FIG. 3A. Since a birefringent crystal plate is reversible, polarizations split by the sixth crystal plate 24 advance the same optical path but in differing directions based on the polarization. Since a Faraday rotator is not reversible, the polarization of the light from the reverse direction is rotated by 45 degrees clockwise as seen in the polarization direction. FIG. 3B illustrates the beams positions at the consecutive positions Z1–Z11. The divergence of the polarizations, 2 and 3 insure high isolation.

In the illustrative embodiment, it is noteworthy that the polarizations 2 and 3 of the input beam are similar to the polarizations at the output position Z11, i.e., the plane of polarization is preserved. Further, since the output beam from the isolator 200 is positioned on the optical axis of the input beam 1, it can be easily coupled to an optical fiber.

Figure 2:
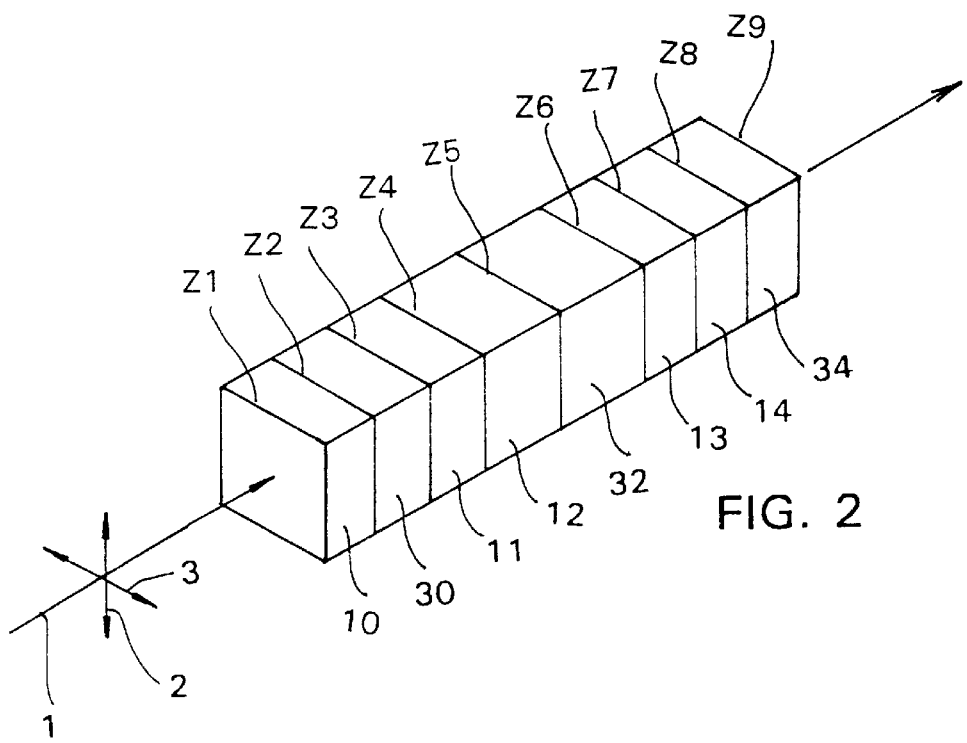
FIG. 2 is a view similar to FIG. 1, showing an alternative embodiment of the present invention.
Figure 4A:
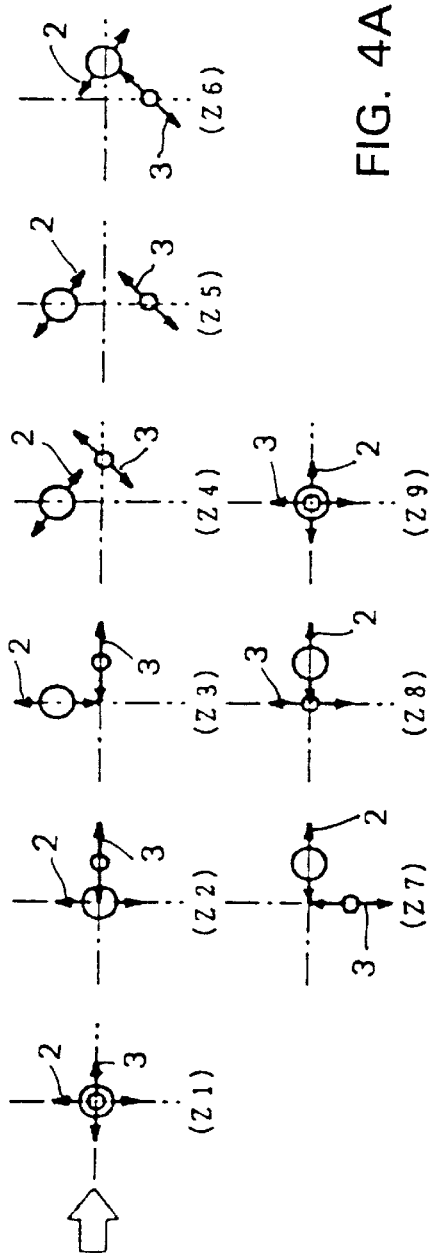
FIGS. 4A and 4B are views similar to FIGS. 3A and 3B, showing polarization components particular to the embodiment of FIG. 2.

FIG. 2 shows a second embodiment of the present invention. FIG. 4A indicates the movements of a forward beam at the positions Z1–Z9 of the optical isolator device shown in FIG. 2, while FIG. 4B indicates the movements of a reverse beam. As shown in FIG. 2, the second embodiment uses components similar to those in isolator 100 of the first embodiment (FIG. 1) and additionally has birefringent crystal plates 30, 32 and 34 each adjoining respectively an ends of the crystal plates 10, 12 and 14. The crystal plates 30, 32 and 34 are substantially identical in thickness with the crystal plates 10, 12 and 14, respectively. The optic axes of the crystal plate 30 is rotated by 90 degrees counter clockwise around the optical axis of the input beam 1 relative to crystal plate 10. Similarly, the optic axis of crystal plates 32 and 34 are rotated by 90 degrees counter clockwise relative to crystal plates 12 and 14 respectively.

Figure 4B:
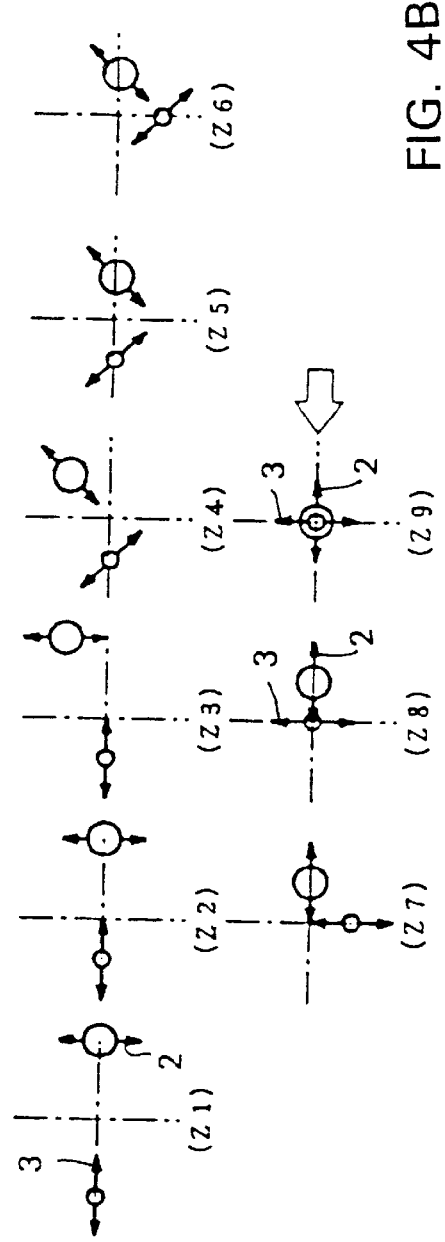

In the configuration shown in FIG. 2, the polarization 2 which is an ordinary ray at the crystal plates 10, 12 and 14 is an extraordinary ray at the crystal plates 30, 32 and 34. Conversely, polarization 3 which is an ordinary ray at crystal plates 30, 32 and 34 is an extraordinary ray at crystal plates 10, 12 and 14. Since the ordinary and extraordinary rays are replaced at the adjoining crystal plates of the same thickness the beam is propagated over an optical path of the same length in each pair of crystal plates (e.g. 10/30, 12/32, 14/34). As a result, the beam passes an overall optical path of the same length without regard to polarization and, therefore, does not suffer from polarization dispersion. In this embodiment, the optical axis of the output beam is also coincident with that of the input beam. Reverse light, however, moves as shown in FIG. 4B, thereby effecting isolation.

Figure 5:
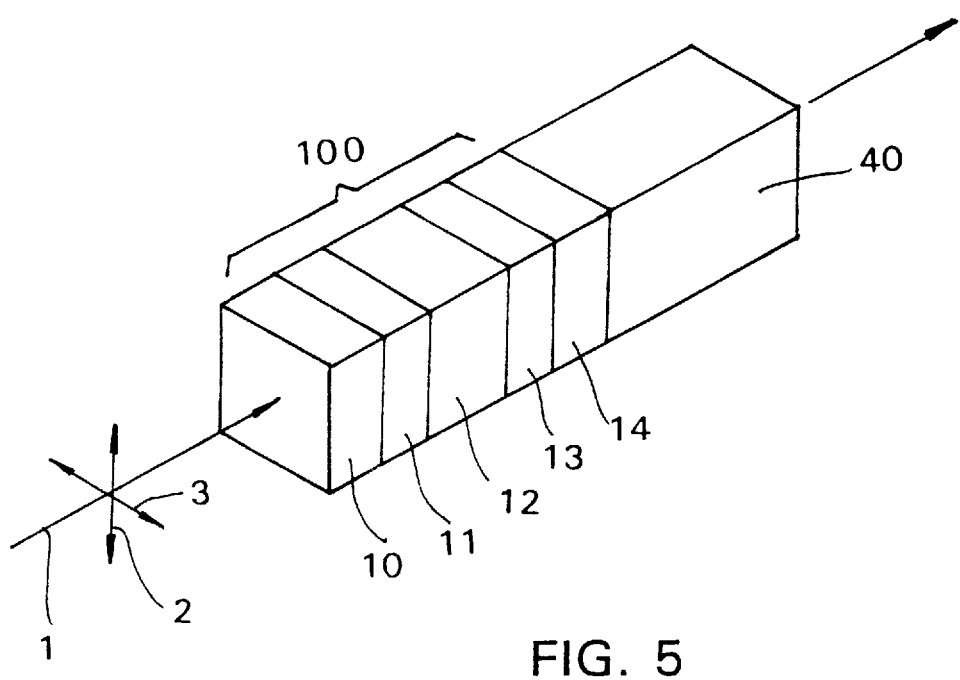
FIG. 5 is a perspective view showing another alternative embodiment of the present invention.

Referring to FIG. 5, another alternative embodiment of the present invention will be described. As shown, the optical isolator device has a phase element 40 which is also implemented by a birefringent crystal and affixed to the output side of the isolator 100, as in FIG. 1. The phase element 40 has a thickness equal to the total thickness of the crystal plates 10, 12 and 14. The optic axis of the phase element 40 is perpendicular to the optical axis of the input beam 1 and also perpendicular to a projection of the optic axis of the crystal plate 14 on a plane perpendicular to the optical axis of the input beam 1.

In this third embodiment, regarding the forward beam, the polarization 2 which is an ordinary ray at the crystal plates 10, 12 and 14 is an extraordinary ray at the phase element 40, while the polarization 3 which is an extraordinary ray at the plates 10, 12 and 14 is an ordinary ray at the element 40. Hence, the forward beam is propagated through the isolator device over an optical path of the same length without regard to polarization and, in principle, free from polarization dispersion. As long as the optic axis of the phase element 40 remains in the above relation with that of the adjoining birefringent crystal plate, element 40 does not affect the isolation of light at all. It follows that as long as this relation is maintained, the phase element 40 may be provided on the front end of the first crystal plate 10 or between any crystal plate and adjoining Faraday rotator, if desired. Further, the phase element 40 may be divided into pieces as long as the total thickness of the pieces is substantially equal to the total thickness of the birefringent crystal plates 10, 12 and 14 and if the optic axis of each piece has the above relation with the axis of the adjoining crystal plate. In addition, the crystal of the phase element 40 may be different from the crystals of the crystal plates 10, 12 and 14 if the thickness thereof is changed.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. For example, in the embodiment shown in FIG. 1, the isolators 100 and 200 each has two Faraday rotators and three birefringent crystal plates. Alternatively, the isolators 100 and 200 may each include a birefringent element for separating an input beam into an ordinary ray and an extraordinary ray, a polarization rotator for rotating the plane of polarization of the ordinary and extraordinary rays by $(2m\pm\frac{1}{2})\times 90$ degrees (m being an integer), and a birefringent element for combining the extraordinary ray passed the rotator with the ordinary ray to output the resulting beam. The gist is that the optic axis of the birefringent element located at the input side of the second isolator be rotated by 90 degrees in the direction of rotation of the rotators of the isolators relative to the optic axis of the birefringent element located at the output side of the first isolator. This is also successful in reversing the polarization state by the birefringent element located at the input side of the second isolator.

What is claimed is:

1. An optical isolator device comprising:

a first and a second optical isolator having an identical thickness and each comprising:

a first birefringent element for separating an input beam into an ordinary ray and an extraordinary ray;

a polarization rotator for rotating a plane of polarization of the ordinary and extraordinary rays by $(2m\pm\frac{1}{2})\times 90$ degrees (m being an integer);

a second birefringent element located at an output side of said polarization rotator and $\sqrt{2}$ times as thick as said first birefringent element, said second birefringent element having an optic axis which is 135 degrees different in orientation from said first birefringent element; and a second polarization rotator for rotating the plane of polarization of the ordinary and extraordinary rays from the second birefringent element by $(2n\pm\frac{1}{2})\times 90$ degrees (n being an integer) in the same direction as the direction of rotation of said first polarization rotator; and a third birefringent element for outputting an output beam comprising a combination of said extraordinary ray and said ordinary ray after said rays have passed through said polarization rotator;

said first and second optical isolators being arranged in series;

said first birefringent element of said second optical isolator having an optic axis rotated by 90 degrees in a direction of rotation of said polarization rotators relative to an optic axis of said third birefringent element of said first optical isolator, whereby said ordinary ray of said third birefringent element of said first optical isolator is said extraordinary ray of said first birefringent element of said second optical isolator, thereby providing an optical path of the same length for all said rays between said input beam of said first optical isolator and said output beam of said second optical isolator.

2. An optical isolator device as claimed in claim 1, wherein said polarization rotators each comprises a Faraday rotator.

* * * * *